US012604171B2

(12) United States Patent
Liu et al.

(10) Patent No.: US 12,604,171 B2
(45) Date of Patent: Apr. 14, 2026

(54) RELAY SESSION ESTABLISHING METHOD AND APPARATUS, DEVICE AND STORAGE MEDIUM

(71) Applicant: GUANGDONG OPPO MOBILE TELECOMMUNICATIONS CORP., LTD., Dongguan (CN)

(72) Inventors: Jianhua Liu, Dongguan (CN); Haorui Yang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 525 days.

(21) Appl. No.: 18/096,201

(22) Filed: Jan. 12, 2023

(65) Prior Publication Data

US 2023/0156451 A1 May 18, 2023

Related U.S. Application Data

(63) Continuation of application No. PCT/CN2020/106436, filed on Jul. 31, 2020.

(51) Int. Cl.
| | |
|---|---|
| *H04W 4/00* | (2018.01) |
| *H04B 7/15* | (2006.01) |

(Continued)

(52) U.S. Cl.
CPC .............. *H04W 8/005* (2013.01); *H04B 7/15* (2013.01); *H04W 48/20* (2013.01)

(58) Field of Classification Search
CPC ....... H04W 8/005; H04W 48/20; H04W 8/00; H04W 48/10; H04W 76/10; H04B 7/15

(Continued)

(56) References Cited

U.S. PATENT DOCUMENTS

| | | | | |
|---|---|---|---|---|
| 10,530,461 B2 * | 1/2020 | Sadiq | .................... | H04W 76/10 |
| 10,609,744 B2 * | 3/2020 | Kim | ...................... | H04W 40/04 |

(Continued)

FOREIGN PATENT DOCUMENTS

| | | |
|---|---|---|
| CN | 106507504 A | 3/2017 |
| CN | 107852591 A | 3/2018 |

(Continued)

OTHER PUBLICATIONS

The Extended European Search Report of corresponding European patent application No. 20947053.3, dated Jun. 30, 2023.

(Continued)

*Primary Examiner* — Marceau Milord

(74) *Attorney, Agent, or Firm* — Ladas & Parry, LLP

(57) ABSTRACT

The present application provides a relay session establishing method and apparatus, a device, and a storage medium. This solution provides a method for discovering a relay device by means of a relay service code and establishing a relay session. A remote device determines, according to description information of traffic, a relay service code that is used for indicating a traffic attribute of the traffic, and discovers an appropriate relay device according to the relay service code, and then establishes a relay session with the relay device, so as to transmit data of the traffic. In this solution, the privacy of traffic attribute can be ensured during the process of discovering the relay device.

14 Claims, 4 Drawing Sheets

(51) Int. Cl.
*H04W 8/00* (2009.01)
*H04W 48/20* (2009.01)

(58) Field of Classification Search
USPC ........................................................ 370/329
See application file for complete search history.

(56) References Cited

U.S. PATENT DOCUMENTS

| | | | | |
|---|---|---|---|---|
| 10,932,175 | B2 * | 2/2021 | Kim ...................... | H04W 36/22 |
| 2011/0238807 | A1 * | 9/2011 | Lee .......................... | H04W 8/24 |
| | | | | 709/223 |
| 2015/0029866 | A1 * | 1/2015 | Liao ...................... | H04W 48/14 |
| | | | | 370/254 |
| 2015/0036578 | A1 * | 2/2015 | Wu .......................... | H04W 4/80 |
| | | | | 370/312 |
| 2015/0172846 | A1 * | 6/2015 | Ge ......................... | H04W 8/005 |
| | | | | 370/254 |
| 2016/0285539 | A1 * | 9/2016 | Sadiq .................... | H04W 8/005 |
| 2016/0381720 | A1 * | 12/2016 | Baek ........................ | H04W 8/14 |
| | | | | 370/329 |
| 2017/0093541 | A1 | 3/2017 | Pan et al. | |
| 2018/0139695 | A1 * | 5/2018 | Gupta ...................... | H04L 12/12 |
| 2018/0279195 | A1 * | 9/2018 | Kim ...................... | H04W 36/22 |
| 2018/0317077 | A1 * | 11/2018 | Kim .................... | H04W 40/246 |
| 2019/0349951 | A1 | 11/2019 | Ahmad | |
| 2019/0387429 | A1 | 12/2019 | Basu Mallick et al. | |
| 2020/0053547 | A1 | 2/2020 | Baek et al. | |
| 2020/0100167 | A1 * | 3/2020 | Cheng .................... | H04W 4/40 |
| 2020/0178343 | A1 | 6/2020 | Kim et al. | |
| 2021/0250749 | A1 | 8/2021 | Cheng et al. | |
| 2022/0330361 | A1 | 10/2022 | Ding et al. | |

FOREIGN PATENT DOCUMENTS

| | | | | |
|---|---|---|---|---|
| CN | 109076639 | A | 12/2018 | |
| CN | 109246688 | A | 1/2019 | |
| CN | 109964468 | A | 7/2019 | |
| CN | 110169097 | A | 8/2019 | |
| EP | 4072234 | A1 * | 10/2022 | ............ H04W 76/14 |
| WO | 2017015788 | A | 2/2017 | |
| WO | 2017193370 | A1 | 11/2017 | |
| WO | 2018086123 | A1 | 5/2018 | |

OTHER PUBLICATIONS

"3rd Generation Partnership Project; Technical Specification Group Services; and System Aspects; Study on system enhancement for Proximity based Services (ProSe) in the 5G System (5GS) (Release 17)";3GPP Draft; 23752-040, 3rd Generation Partnership Project;(3GPP), Mobile Competence Centre ; 650, Route Des Lucioles;F-06921 Sophia-Antipolis Cedex ; France;Jun. 25, 2020 (Jun. 25, 2020), XP051906328, 3GPP TR 23.752 V0.4.0(Jun. 2020).

International Search Report in the international application No. PCT/CN2020/106436 mailed on Apr. 16, 2021.

Written Opinion of the International Search Authority in the international application No. PCT/CN2020/106436, mailed on Apr. 16, 2021.

Philips International B.V. 'UE-to-Network Relay discovery and handling of PDU session parameters with Remote UE based relay selection.' S2-2004202, SA WG2 Meeting #139e, Elbonia, Jun. 1-12, 2020.

Interdigital Inc. 'KI#3, New Solution #X: L3 UE-to-Network Relay discovery and connection establishment' S2-2004733 SA WG2 Meeting #S2-139E, Jun. 1-12, 2020, Electronic, Elbonia.

Philips International B.V. 'UE-to-Network Relay discovery and handling of PDU session parameters with CN based relay selection.' S2-2004201, SA WG2 Meeting #139e, Elbonia, Jun. 1-12, 2020.

The first Office Action of corresponding European application No. 20947053.3, dated Nov. 30, 2023.

The first Office Action and search report of corresponding Chinese patent application No. 202310349584.2 dated Jul. 24, 2024.

The Non-final rejection from the corresponding U.S. Appl. No. 18/090,607, dated Mar. 28, 2025.

InterDigital Inc. "Solution for KI #3: Support of UE-to-Network Relay", S2-1911798, SA WG2 Meeting #136, Nov. 18-22, 2019, Reno, US.

International Search Report (ISR) and Written Opinion of the International Searching Authority dated Apr. 25, 2021 for Application No. PCT/CN2020/106316.

The EESR of corresponding European patent application No. 20947286.9, dated Jul. 28, 2023.

The second Office Action of corresponding European patent application No. 20947286.9, dated Aug. 22, 2024.

The first Office Action of corresponding European patent application No. 20947286.9, dated Feb. 22, 2024.

Pending U.S. Appl. No. 18/090,607, filed Dec. 29, 2022, inventor: Jianhua Liu.

The Final rejection issued in the corresponding U.S. Appl. No. 18/090,607, dated Oct. 22, 2025.

The Advisory Action in the corresponding U.S. Appl. No. 18/090,607, dated Dec. 29, 2025.

The first Office Action of corresponding Chinese patent application No. 202310372197.0, dated Nov. 12, 2025, with search report.

The Non-final rejection issued in the corresponding U.S. Appl. No. 18/090,607, dated Feb. 11, 2026.

* cited by examiner

Determine a relay service code according to description information of traffic, where the relay service code is used for indicating a traffic attribute of the traffic — S101

Discover a relay device according to the relay service code — S102

Establish a relay session with the relay device, where the relay session is used for transmitting data of the traffic — S103

RELAY SESSION ESTABLISHING METHOD AND APPARATUS, DEVICE AND STORAGE MEDIUM

CROSS-REFERENCE TO RELATED APPLICATIONS

This application is a continuation of International Application No. PCT/CN2020/106436, filed on Jul. 31, 2020, the disclosure of which is hereby incorporated by reference in its entirety.

TECHNICAL FIELD

Embodiments of the present application relate to communication technology, and in particular, to a relay session establishing method and apparatus, a device and a storage medium.

BACKGROUND

In order to meet the challenge of wireless broadband technology and maintain the leading edge of the 3rd generation partnership project (3GPP) network, the 3GPP standard group specifies a network architecture of the next generation mobile communication system, which is called the fifth generation (5G) network architecture. This architecture not only supports accessing a 5G core network by virtue of wireless technology defined by the 3GPP standard group, but also supports accessing the 5G core network by virtue of non-3GPP access technology.

In Rel-13 ProSe, 3GPP introduced a layer 3 relay-based UE-to-network relay function, which means that a remote user equipment (UE) accesses the network through a relay UE, and the relay UE undertakes the relay function of the internet protocol (IP) layer, and transmits data between the remote UE and the network, while the remote UE and the relay UE are connected through a side link. FIG. 1 is a schematic structural diagram of a relay network. As shown in FIG. 1, the remote UE and the relay UE need to be authorized before the remote UE and the relay UE realize data relay functions. The remote UE determines parameters needed to establish a session according to a user equipment routing selection policy (URSP) rule configured by the network, and then establishes the session between the remote UE and the relay UE to transmit relay data.

At present, there is no session establishment solution to ensure the privacy of traffic data in the prior art.

SUMMARY

Embodiments of the present application provide a relay session establishing method and apparatus, a device and a storage medium, and propose a session establishment solution which can ensure the privacy of traffic data.

According to a first aspect, an embodiment of the present application may provide a relay session establishing method which is applied to a remote device, and the method includes:

determining a relay service code according to description information of traffic, where the relay service code is used for indicating a traffic attribute of the traffic;

discovering a relay device according to the relay service code;

establishing a relay session with the relay device, where the relay session is used for transmitting data of the traffic.

According to a second aspect, an embodiment of the present application may provide a relay session establishing method which is applied to a relay device, and the method includes:

determining a remote device for relaying according to a relay service code, where the relay service code is used for indicating a traffic attribute of traffic supported by the relay device or authorized to be supported by the relay device;

establishing a relay session with the remote device, where the relay session is used for transmitting data of the traffic.

According to a third aspect, an embodiment of the present application may provide a relay session establishing apparatus, including:

a processing module, configured to determine a relay service code according to description information of traffic, where the relay service code is used for indicating a traffic attribute of the traffic;

an interacting module, configured to discover a relay device according to the relay service code;

where the interacting module is further configured to establish a relay session with the relay device, where the relay session is used for transmitting data of the traffic.

According to a fourth aspect, an embodiment of the present application may provide a relay session establishing apparatus, including:

a processing module, configured to determine a remote device for relaying according to a relay service code, where the relay service code is used for indicating a traffic attribute of traffic supported by the relay session establishing apparatus or authorized to be supported by the relay session establishing apparatus;

an interacting module, configured to establish a relay session with the remote device, where the relay session is used for transmitting data of the traffic.

According to a fifth aspect, an embodiment of the present application may provide a remote device, which includes:

a processor, a memory, and an interface for communicating with a relay device;

the memory stores computer-executable instructions;

the processor executes the computer-executable instructions stored in the memory, so that the processor executes the relay session establishing method according to the first aspect.

According to a sixth aspect, an embodiment of the present application may provide a relay device, which includes:

a processor, a memory, and an interface for communicating with other relay devices or network devices;

the memory stores computer-executable instructions;

the processor executes the computer-executable instructions stored in the memory, so that the processor executes the relay session establishing method according to the second aspect.

According to a seventh aspect, an embodiment of the present application may provide a computer-readable storage medium storing computer-executable instructions, when being executed by a processor, the computer-executable instructions are used to implement the relay session establishing method according to the first aspect.

According to an eighth aspect, an embodiment of the present application may provide a computer-readable storage medium storing computer-executable instructions, when being executed by a processor, the computer-executable instructions are used to implement the relay session establishing method according to the second aspect.

According to a ninth aspect, an embodiment of the present application may provide a chip including a processing module and a communication interface, where the processing module is configured to execute the relay session establishing method according to the first aspect.

According to a tenth aspect, an embodiment of the present application may provide a chip including a processing module and a communication interface, where the processing module is configured to execute the relay session establishing method according to the second aspect.

According to the relay session establishing method and apparatus, the device and the storage medium provided by the embodiments of the present application, a method for discovering a relay device through a relay service code and establishing a relay session is provided, where a remote device determines a relay service code used for indicating a traffic attribute of the traffic according to description information of the traffic, discovers an appropriate relay device according to the relay service code, and then establishes a relay session with the relay device to transmit data of the traffic. According to this solution, the privacy of the traffic attribute is ensured during the process of discovering the relay device.

BRIEF DESCRIPTION OF THE DRAWINGS

To describe the embodiments of the present application or the technical solutions in the prior art more clearly, in the following, accompanying drawings that need to be used in the embodiments or the prior art will be described briefly. It is clear that, the accompanying drawings in the following description merely show some embodiments of the present application, and a person of ordinary skill in the art can derive other accompanying drawings from these accompanying drawings without paying creative efforts.

DESCRIPTION OF EMBODIMENTS

Figures 1, 2:
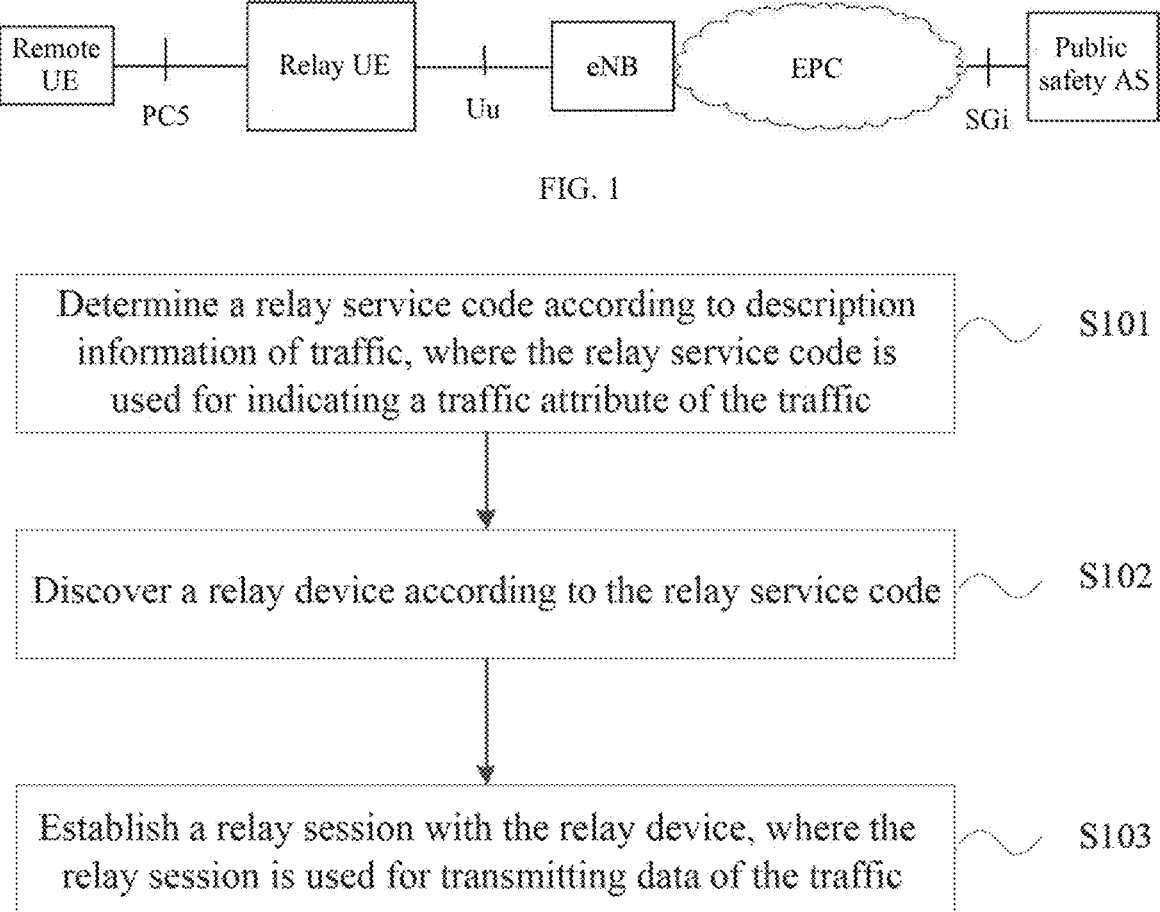
FIG. 1 is a schematic structural diagram of a relay network.
FIG. 2 is a schematic flowchart of a first embodiment of a relay session establishing method provided by an embodiment of the present application.

In order to make the objectives, technical solutions, and advantages of the embodiments of the present application clearer, the technical solutions in the embodiments of the present application will be clearly and completely described with reference to the accompanying drawings in the embodiments of the present application. Obviously, the described embodiments are only some, and not all, of the embodiments of the present application. All other embodiments obtained based on the embodiments of the present application by those skilled in the art fall into the scope of protection defined by the present application.

The terms "first" and "second" in the description, claims in present disclosure and the above accompanying drawings are used to distinguish similar objects, and are not necessarily used to describe a specific order or sequence. It should be understood that the number used in this way can be interchangeable where appropriate, so that the embodiments of the present application described here, for example, can be implemented in order other than those illustrated or described here. In addition, the terms the "including" and "having" and any variations thereof are intended to cover non-exclusive inclusion, for example, processes, methods, systems, products or devices that contain a series of steps or units are not necessarily limited to those steps or units that are clearly listed, but may include other steps or units that are not clearly listed or that are inherent to those processes, methods, products or devices.

In relay communication, in order to transmit traffic data of a remote device, the relay device needs to use an appropriate protocol data unit (PDU) session, which session will be used for transmitting data is decided by the relay device, and the relay device needs corresponding parameters when establishing a relay PDU session. In a usual session establishment process, the relay device determines parameters needed for establishing the PDU session according to a URSP rule configured by a network, however, the privacy of a traffic attribute cannot be ensured in such process.

Based on the above, in order to solve the privacy problem of the traffic attribute, the concept of relay service code (RSC) is introduced. An RSC can characterize a traffic attribute of traffic. The present application provides a relay session establishing method. In relay communication, a relay device may broadcast an RSC that can be supported. When the remote device performs relay traffic, it is necessary to first find a relay device for the relay traffic. In the solution provided in the present application, the remote device needs to be able to confirm the RSC that needs to be relayed before discovering the relay device, and the remote device determines the relay device based on the RSC, and then establishes a session with the relay device to transmit data of the traffic.

In this solution, it should be understood that it mainly involves two kinds of execution bodies: a relay device and a remote device. In the process of data transmission, the remote device may interact with the network device through the relay device. Taking FIG. 1 as an example, the relay UE and the remote UE interact with the network side through the connection scenario shown in FIG. 1. In this solution, it should be understood that the remote device or relay device can be a user equipment (UE), a terminal device, a communication terminal, a mobile terminal device, etc., which is not limited in this solution.

For example, the remote device or relay device used here includes, but is not limited to, devices connected via a wired line, such as a public switched telephone network (PSTN), a digital subscriber line (DSL), a digital cable or a direct cable; and/or devices connected via another data connection/network; and/or connected via wireless interfaces, such as a cellular network, a wireless local area network (WLAN), a digital television network such as a DVB-H network, a satellite network, an AM-FM broadcast transmitter; and/or devices configured to receive/send communication signals; and/or internet of things (IoT) devices. A UE set to communicate through a wireless interface may be called a "wireless communication terminal", "wireless terminal", or "mobile terminal". Examples of mobile terminals include, but are not limited to, a satellite or a cellular phone; a personal communications system (PCS) terminal that may combine a cellular radio telephone with data processing, faxing and data communication capabilities; a PDA, which may include a radio telephone, a pager, an internet/intranet access, a Web browser, a notebook, a calendar and/or a global positioning system (GPS) receiver; and a conventional laptop and/or palmtop receiver or other electronic device including a radio telephone transceiver. In a specific implementation, the remote device or relay device may be an access terminal, a subscriber unit, a subscriber station, a mobile station, a mobile platform, a remote station, a remote terminal, a mobile device, a user terminal, a terminal, a wireless communication device, a user agent or a user apparatus, and may also be a cellular phone, a cordless phone, a session initiation protocol (SIP) telephone, a wireless local loop (WLL) station, a personal digital assistant (PDA), a handheld device with wireless communication function, a computing device or other processing device connected to a wireless modem, a vehicle-mounted device, a wearable device, a terminal device in a 5G network or a terminal device in a future evolved public land mobile network (abbreviated as PLMN), etc.

FIG. 2 is a schematic flowchart of a first embodiment of a relay session establishing method provided by an embodiment of the present application. As shown in FIG. 2, the relay session establishing method includes the following steps.

S101, determine a relay service code according to description information of traffic, where the relay service code is used for indicating a traffic attribute of the traffic.

In this step, when a remote device needs a relay device for transmitting data of the traffic, the remote device can obtain the description information of the traffic, where the description information of the traffic may include characteristics of application identification, domain information, IP address, traffic attribute of the traffic and the like.

The remote device may determine the relay service code of the traffic through the description information of the traffic. The relay service code is used to describe the traffic attribute of the traffic, that is, the relay service code may be used to replace the traffic attribute of the traffic for interaction in the session establishment process.

Specifically, specific ways for the remote device to determine the relay service code at least include the following ways.

In a first way, determine the relay service code corresponding to the traffic according to a first correspondence between traffic attributes and relay service codes, and the description information of the traffic, where the description information includes the traffic attribute of the traffic.

In this solution, determine the first correspondence according to a user equipment routing selection policy (URSP), and the URSP includes a relay service code corresponding to each service description. The URSP includes traffic description components and routing selection description components, in which the traffic description components may have characteristics of IP address, domain information, application identification and the like. Add a corresponding RSC value in the routing selection description components, or add a new item: RSC in the URSP, in this way, the correspondence between the traffics and the relay service codes can be realized. For example, as shown in Table 1 below:

TABLE 1

| Information name | Description | Category | PCF permitted to modify in a UE context | Scope |
|---|---|---|---|---|
| Rule Precedence | Determines the order the URSP rule is enforced in the UE. | Mandatory (NOTE 1) | Yes | UE context |
| Traffic descriptor | This part defines the Traffic descriptor components for the URSP rule. | Mandatory (NOTE 3) | | |
| Application descriptors | It consists of OSId and OSAppId(s). (NOTE 2) | Optional | Yes | UE context |
| IP descriptors (NOTE 5) | Destination IP 3 tuple(s) (IP address or IPv6 network prefix, port number, protocol ID of the protocol above IP). | Optional | Yes | UE context |
| Domain descriptors | Destination FQDN(s) | Optional | Yes | UE context |
| Non-IP descriptors (NOTE 5) | Descriptor(s) for destination information of non-IP traffic | Optional | Yes | UE context |
| DNN | This is matched against the DNN information provided by the application. | Optional | Yes | UE context |
| Connection Capabilities | This is matched against the information provided by a UE application when it requests a network connection with certain capabilities. (NOTE 4) | Optional | Yes | UE context |
| List of Route Selection Descriptors | A list of Route Selection Descriptors. The components of a Route Selection Descriptor are described in table 6.6.2.1-3. | Mandatory | | |

After determining the first correspondence according to the URSP, the remote device may determine the relay service code corresponding to the traffic according to the traffic attribute in the description information of the traffic to be transmitted and the correspondence.

In a second way, determine a data network name (DNN) of the traffic according to the description information of the traffic and the URSP; and determine the relay service code corresponding to the traffic according to a second correspondence between DNNs and relay service codes and the DNN of the traffic.

In this solution, the second correspondence is pre-configured in the remote device or configured through a PLMN. That is to say, the fixed correspondence between the DNNs and the relay service codes may be configured before the remote device leaves the factory, or the correspondence between the DNNs and the relay service codes may be configured in the remote device through the network side.

The remote device first needs to determine the DNN of the traffic according to the description information and the URSP configured on the network side, and then determines the relay service code corresponding to the traffic according to the DNN and the above obtained correspondence between the DNNs and the relay service codes.

In a third way, determine slice information of the traffic according to the description information of the traffic and the user equipment routing selection policy (URSP); and determine the relay service code corresponding to the traffic according to a third correspondence between slice information and relay service codes and the slice information of the traffic.

In this solution, the third correspondence is pre-configured in the remote device or configured through a PLMN. That is to say, the fixed correspondence between the slice information and the relay service codes may be configured before the remote device leaves the factory, or the correspondence between the slice information and the relay service codes may be configured in the remote device through the network side.

The remote device first needs to determine the slice information of the traffic according to the description information and the URSP configured on the network side, and then determines the relay service code corresponding to the traffic according to the slice information and the above obtained correspondence between the slice information and the relay service codes.

S102, discover a relay device according to the relay service code.

In this step, after determining the relay service code corresponding to the traffic, the remote device finds an appropriate relay device based on the relay service code. In the specific implementation of this solution, the relay device is also configured with a relay service code that can be supported by the relay device or can be authorized to be supported by the relay device. The appropriate relay device may be determined by matching the relay service code between the remote device and the relay device.

S103, establish a relay session with the relay device, where the relay session is used for transmitting data of the traffic.

In this step, the remote device interacts with the relay device after determining the relay device to establish a relay session. That is to say, the remote device establishes with the relay device a PDU session (or also called a relay PDU session, which is not limited by this solution). In this solution, the relay session is mainly used to transmit the data of the traffic above.

The relay session establishing method provided in the embodiment is a method for discovering a relay device through a relay service code and establishing a relay session is provided, where a remote device determines a relay service code used for indicating a traffic attribute of the traffic according to description information of the traffic, discovers an appropriate relay device according to the relay service code, and then establishes a relay session with the relay device to transmit data of the traffic. According to this solution, the privacy of the traffic attribute is ensured during the process of discovering the relay device.

Figure 3:
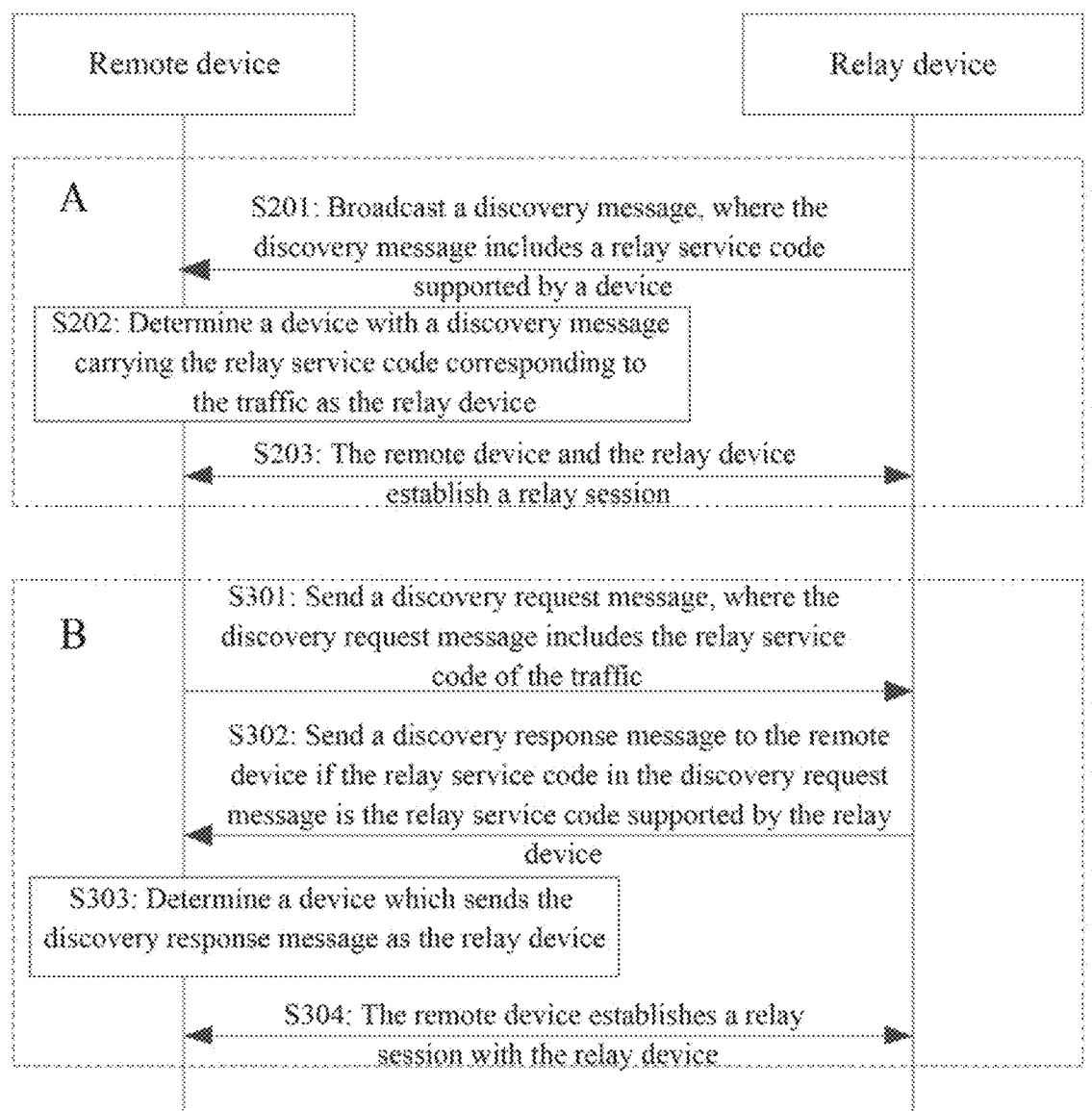
FIG. 3 is a schematic flowchart of a second embodiment of a relay session establishing method provided by an embodiment of the present application.

FIG. 3 is a schematic flowchart of a second embodiment of a relay session establishing method provided by an embodiment of the present application. As shown in FIG. 3, on the basis of the embodiment shown in FIG. 2, after obtaining the relay service code, the remote device discovers the relay device according to the relay service code, which can be implemented in at least two models: Model A or Model B, specifically including the following steps.
Model A S201, broadcast a discovery message, where the discovery message includes a relay service code supported by a device.

In this step, the remote device receives discovery messages broadcasted by multiple devices. For multiple devices that may realize relay functions, they may broadcast discovery messages carrying relay service codes that are supported by the multiple devices or are authorized to be supported by the multiple devices, that is, the discovery message broadcasted by a respective device carries a relay service code that is supported by said device or is authorized to be supported by said device.

S202, determine a device with a discovery message carrying the relay service code corresponding to the traffic as the relay device.

The remote device determines the device whose discovery message carries the relay service code corresponding to the traffic as the relay device by detecting the relay service codes in the received discovery messages and the relay service code of the traffic determined by itself.

S203: the remote device and the relay device establish a relay session.

After the remote device determines the relay device, the relay device and the remote device establish, through interaction, a relay session for transmitting the data of the traffic.

In another implementation of Model A, the discovery message may also carry a DNN or slice information of traffic supported by the device. After receiving the discovery message, the remote device determines the DNN or slice information of the traffic according to the relay service code, then determines the relay device according to the DNN of the traffic and the DNN in the discovery message sent by each device, or determines the relay device according to the slice information of the traffic and the slice information in the discovery message sent by each device.
Model B S301, send a discovery request message, where the discovery request message includes the relay service code of the traffic.

In this step, when data of traffic needs to be relayed, the remote device sends a discovery request message carrying the relay service code of the traffic, and multiple devices with relay functions receive the discovery request message, where the discovery request message includes the relay service code corresponding to the traffic.

S302, send a discovery response message to the remote device if the relay service code in the discovery request message is the relay service code corresponding to the traffic attribute supported by the relay device or authorized to be supported by the relay device.

Among the relay devices, each device compares the relay service code that it supports or is authorized to support with the relay service code in the received discovery request message, and if the relay service codes are the same, the relay device may send a discovery response message to the remote device, said discovery response message is mainly for confirming the relay service code that may support this traffic with the remote device.

The remote device receives the discovery response message.

In this solution, it should be understood that the relay service code at the relay device side is used to indicate the traffic attribute of the traffic that is supported by the relay device or is authorized to be supported by the relay device.

S303, determine a device which sends the discovery response message as the relay device.

In this step, the remote device determines a device that has sent the discovery response message to the remote device as the relay device.

S304, the remote device establishes a relay session with the relay device.

After the remote device determines the relay device, the relay device and the remote device establish, through interaction, a relay session for transmitting the data of the traffic.

According to the above solutions, in the discovery process of Model A, the remote device selects the device whose discovery message carries the above determined RSC as the relay device; or in the discovery process of Model B, the remote device carries the above determined RSC in the discovery request message sent, and after the relay device receives the message, the relay device judges whether to respond to the discovery request message according to the RSC carried in the message. If the relay side can support or be authorized to support the RSC of the remote device, the relay device responds to the discovery request message.

In the above solutions, the remote device determines the relay device to be used according to the relay service code, and correspondingly, the relay device also determines the remote device providing service in the process. Specifically, the relay device determines the remote device providing service based on the relay service code that the relay device supports or is authorized to support and the relay service code of the traffic of the remote device. The relay device and the remote device establish a relay session for transmitting data of the traffic.

In all of the above embodiments, the remote device discovers the relay device through the relay service code, and an embodiment of the present application further provides a method for discovering a relay device based on a DNN or slice information (slice). Specifically, the discovery messages broadcasted by the devices that may provide relay service carry DNNs or slice information, and the remote device determines the appropriate relay device according to a DNN or slice information after receiving the discovery messages broadcasted by different devices.

In a specific implementation, the remote device determines the DNN/slice information according to a preconfigured correspondence between RSCs and DNNs, slice information; or if the RSC contains an information field of DNN/slice information, the DNN or slice information is determined according to the information field.

According to the method for discovering a relay device provided by the present solution, the relay device may be discovered through a DNN or slice information. After the relay device is determined, a relay session is established between the remote device and the relay device for transmitting data of the traffic. In this solution, the privacy of the traffic attribute may be ensured during the process of discovering the relay device.

Figures 4, 5:
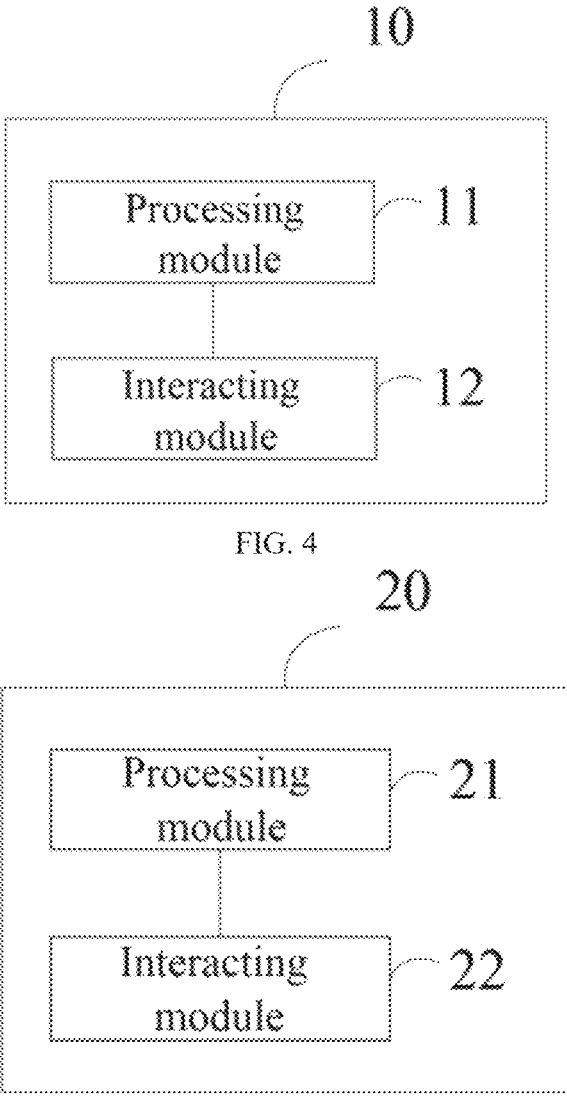
FIG. 4 is a schematic flowchart of a first embodiment of a relay session establishing apparatus provided by an embodiment of the present application.
FIG. 5 is a schematic flowchart of a second embodiment of a relay session establishing apparatus provided by an embodiment of the present application.

FIG. 4 is a schematic flowchart of a first embodiment of a relay session establishing apparatus provided by an embodiment of the present application. As shown in FIG. 4, the relay session establishing apparatus 10 includes:

a processing module 11, configured to determine a relay service code according to description information of traffic, where the relay service code is used for indicating a traffic attribute of the traffic;

an interacting module 12, configured to discover a relay device according to the relay service code;

where the interacting module 12 is further configured to establish a relay session with the relay device, where the relay session is used for transmitting data of the traffic.

In a specific implementation of the relay session establishing apparatus 10, the processing module 11 is specifically configured to:

determine the relay service code corresponding to the traffic according to a first correspondence between traffic attributes and relay service codes and the description information of the traffic, where the description information includes the traffic attribute of the traffic.

In an implementation, the first correspondence is determined according to a URSP, and the URSP includes a relay service code corresponding to each service description.

In another specific implementation, the processing module 11 is specifically configured to:

determine a DNN of the traffic according to the description information of the traffic and a user equipment routing selection policy (URSP);

determine the relay service code corresponding to the traffic according to a second correspondence between DNNs and relay service codes and the DNN of the traffic.

Further, the second correspondence is pre-configured in the relay session establishing apparatus or configured through a public land mobile network (PLMN).

In another specific implementation, the processing module 11 is specifically configured to:

determine slice information of the traffic according to the description information of the traffic and a URSP;

determine the relay service code corresponding to the traffic according to a third correspondence between slice information and relay service codes and the slice information of the traffic.

In an implementation, the third correspondence is pre-configured in the relay session establishing apparatus or configured through a PLMN.

On the basis of any of the foregoing implementations, the interacting module 12 is specifically configured to receive discovery messages broadcasted by multiple devices, where the discovery message of each device carriers a relay service code supported by the device supports or authorized to be supported by the device;

the processing module 11 is further configured to determine a device with a discovery message carrying the relay service code corresponding to the traffic as the relay device.

In an implementation, the interacting module 12 is specifically configured to:

send a discovery request message, where the discovery request message includes the relay service code;

receive a discovery response message;

the processing module 11 is further configured to determine a device sending the discovery response message as the relay device.

In another implementation, the interacting module 12 is specifically configured to receive discovery messages broadcasted by multiple devices, where the discovery message includes a DNN or slice information of traffic supported by each device;

the processing module 11 is specifically configured to:

determine a DNN or slice information of the traffic according to the relay service code;

determine the relay device according to the DNN of the traffic and a DNN in a discovery message sent by each device, or determine the relay device according to slice information of the traffic and slice information in a discovery message sent by each device.

The relay session establishing apparatus provided in any of the above embodiments is configured to implement the technical solution of the remote device side in any of the above method embodiments, and its implementation principle and technical effect are similar to those of the method embodiments. By using the relay service code to discover the relay device and establish the relay session, the privacy of traffic attribute can be ensured.

FIG. 5 is a schematic flowchart of a second embodiment of a relay session establishing apparatus provided by an embodiment of the present application. As shown in FIG. 5, the relay session establishing apparatus 20 includes:

a processing module 21, configured to determine a remote device for relaying according to a relay service code, where the relay service code is used for indicating a traffic attribute of traffic supported by the relay session establishing apparatus or authorized to be supported by the relay session establishing apparatus, an interacting module 22, configured to establish a relay session with the remote device, where the relay session is used for transmitting data of the traffic.

In an implementation, the relay service code corresponding to the traffic attribute supported by the relay session establishing apparatus or authorized to be supported by the relay session establishing apparatus is pre-configured or configured by a network device.

Figure 6:
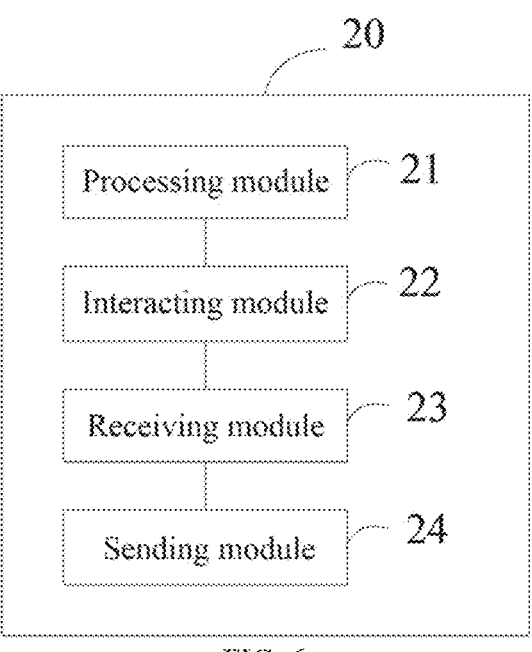
FIG. 6 is a schematic flowchart of a third embodiment of a relay session establishing apparatus provided by an embodiment of the present application.

FIG. 6 is a schematic flowchart of a third embodiment of a relay session establishing apparatus provided by an embodiment of the present application. As shown in FIG. 6, the relay session establishing apparatus 20 further includes a receiving module 23 and a sending module 24.

In a specific implementation, the sending module 24 is configured to broadcast a discovery message, where the discovery message includes the relay service code.

In another specific implementation, the receiving module 23 is configured to receive a discovery request message sent by a remote device, where the discovery request message includes a relay service code corresponding to traffic;

the sending module 24 is configured to send a discovery response message to the remote device if the processing module determines that the relay service code in the discovery request message is the relay service code supported by the relay session establishing apparatus 20.

In another implementation, the sending module 24 is configured to broadcast a discovery message, where the discovery message includes a DNN or slice information, and the DNN or the slice information is determined according to the relay service code.

The relay session establishing apparatus provided in any of the above embodiments is configured to implement the technical solution of the relay device side in any of the above method embodiments, and its implementation principle and technical effect are similar to those of the method embodiments. By using the relay service code to discover the relay device and establish the relay session, the privacy of traffic attribute can be ensured.

Figure 7:
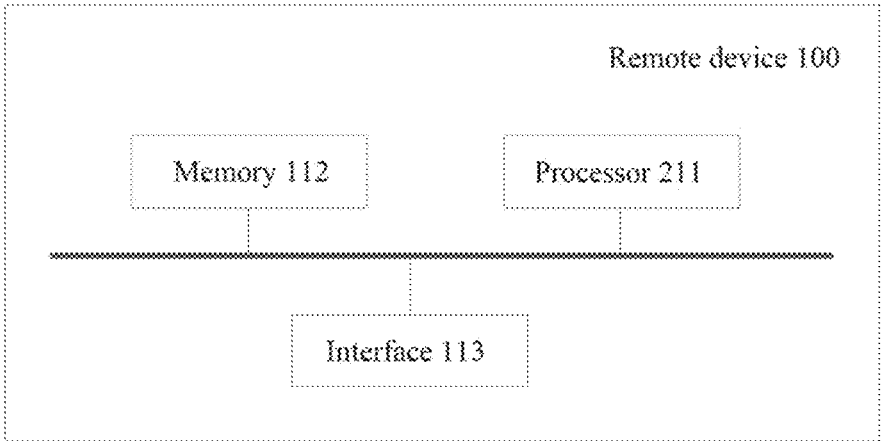
FIG. 7 is a schematic flowchart of an embodiment of a remote device provided by an embodiment of the present application.

FIG. 7 is a schematic flowchart of an embodiment of a remote device provided by an embodiment of the present application. As shown in FIG. 7, the remote device 100 includes:

a processor 111, a memory 112, and an interface 113 for communicating with a relay device;

the memory 112 stores computer-executable instructions;

the processor 111 executes the computer-executable instructions stored in the memory, so that the processor executes the technical solution of the remote device in the aforementioned method embodiments.

Figure 8:
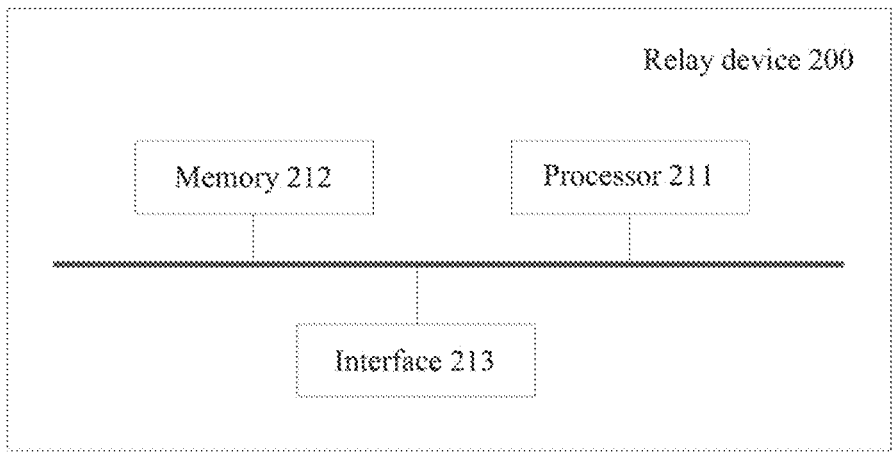
FIG. 8 is a schematic flowchart of an embodiment of a relay device provided by an embodiment of the present application.

FIG. 8 is a schematic flowchart of an embodiment of a relay device provided by an embodiment of the present application. As shown in FIG. 8, the relay device 200 includes:

a processor 211, a memory 212, and an interface 213 for communicating with other relay devices or network devices;

the memory 212 stores computer-executable instructions, the processor 211 executes the computer-executable instructions stored in the memory 212, so that the processor 211 executes the technical solution of the relay device in the aforementioned method embodiments.

In a specific implementation of the above-mentioned remote device or relay device, the memory, the processor and the interface may be connected by bus or in other ways. In an implementation, the memory may be integrated inside the processor.

An embodiment of the present application provides a computer-readable storage medium storing computer-executable instructions, when being executed by a processor, the computer-executable instructions are used to implement the solution of the remote device side in the method embodiment.

An embodiment of the present application provides a computer-readable storage medium storing computer-executable instructions, when being executed by a processor, the computer-executable instructions are used to implement the solution of the relay device side in the method embodiment.

An embodiment of the present application provides a chip including a processing module and a communication interface, where the processing module is configured to execute the technical solution of the remote device side in the above method embodiments.

An embodiment of the present application provides a chip including a processing module and a communication interface, where the processing module is configured to execute the technical solution of the relay device side in the above method embodiments.

Furthermore, any of the above chips further includes a storage module (such as a memory), which is configured to store instructions, and the processing module is configured to execute the instructions stored in the storage module, and the execution of the instructions stored in the storage module causes the processing module to execute the technical solution of the relay device or the remote device in any of the above method embodiments.

In several embodiments provided in the present application, it should be understood that the disclosed device and method may be implemented in other ways. For example, the above device embodiments are only schematic, for example, the division of the modules is only a logical function division, and there may be another division ways in actual implementations, for example, multiple modules may be combined or integrated into another system, or some features may be ignored or not executed. On the other hand, the shown or discussed mutual coupling or direct coupling or communication connection may be indirect coupling or communication connection through some interfaces and modules, which may be in electrical, mechanical or other forms.

In the specific implementation of any of the above devices, it should be understood that the processor may be a central processing unit (abbreviated as CPU), or other general-purpose processor, a digital signal processor (abbreviated as DSP), an application specific integrated circuit (abbreviated as ASIC), etc. The general purpose processor may be a microprocessor or the processor may be any conventional processor or the like. The steps in combination with the method disclosed in the present application can be directly embodied as being executed by a hardware processor, or executed by a combination of hardware and software modules in the processor.

All or part of the steps to implement the above-mentioned method embodiments can be completed by hardware related to program instructions. The above mentioned program can be stored in a readable memory. When the program is executed, the steps including the above method embodiments are executed; the above mentioned memory (storage medium) includes: a read-only memory (abbreviated as ROM), an RAM, a flash memory, a hard disk, a solid-state disk, a magnetic tape, a floppy disk, an optical disk and any combination thereof.

What is claimed is:

1. A relay session establishing method, performed by a remote device, wherein the method comprises:

determining a relay service code, RSC, of a traffic, according to description information of the traffic to be transmitted, and an RSC corresponding to each traffic description, the traffic description having at least one characteristic of IP address, domain information, and application identification;

wherein the description information of the traffic comprises at least one characteristic of application identification, domain information, IP address, and traffic attribute of the traffic;

wherein the relay service code is used for indicating a traffic attribute of the traffic in the session establishment process;

discovering a relay device according to the relay service code;

establishing a relay session with the relay device, wherein the relay session is used for transmitting data of the traffic.

2. The method according to claim 1, wherein discovering the relay device according to the relay service code comprises:

receiving discovery messages broadcasted by multiple devices, wherein the discovery message of each device carriers a relay service code supported by the device or authorized to be supported by the device;

determining a device with a discovery message carrying the relay service code corresponding to the traffic as the relay device.

3. The method according to claim 1, wherein discovering the relay device according to the relay service code comprises:

sending a discovery request message, wherein the discovery request message comprises the relay service code;

receiving a discovery response message, and determining a device sending the discovery response message as the relay device.

4. A non-transitory computer-readable storage medium storing computer-executable instructions, when being executed by a processor, the computer-executable instructions are used to implement the relay session establishing method according to claim 1.

5. A chip, comprising a processing module and a communication interface, wherein the processing module is configured to execute the relay session establishing method according to claim 1.

6. A relay session establishing method, performed by a relay device, wherein the method comprises:

determining a remote device for relaying according to a relay service code, RSC, of a traffic, wherein the relay service code is used for indicating a traffic attribute of traffic supported by the relay device or authorized to be supported by the relay device;

establishing a relay session with the remote device, wherein the relay session is used for transmitting data of the traffic;

wherein determining the remote device for relaying according to the relay service code comprises:

receiving a discovery request message sent by a remote device, wherein the discovery request message comprises a relay service code corresponding to the traffic, wherein the relay service code in the discovery request message is determined by the remote device according to description information of the traffic to be transmitted, and an RSC corresponding to each traffic description, the traffic description having at least one characteristic of IP address, domain information, and application identification, wherein the description information of the traffic comprises at least one characteristic of application identification, domain information, IP address, and traffic attribute of the traffic;

sending a discovery response message to the remote device if the relay service code in the discovery request message is the relay service code corresponding to the traffic attribute supported by the relay device or authorized to be supported by the relay device.

7. The method according to claim 6, wherein the relay service code corresponding to the traffic attribute supported by the relay device or authorized to be supported by the relay device is pre-configured or configured by a network device.

8. The method according to claim 6, wherein determining the remote device for relaying according to the relay service code comprises:

broadcasting a discovery message, wherein the discovery message comprises the relay service code.

9. A relay device, comprising:

a processor, a memory, and an interface for communicating with other relay devices or network devices;

the memory stores computer-executable instructions;

the processor executes the computer-executable instructions stored in the memory, so that the processor executes the relay session establishing method according to claim 6.

10. A non-transitory computer-readable storage medium storing computer-executable instructions, when being executed by a processor, the computer-executable instructions are used to implement the relay session establishing method according to claim 6.

11. A chip, comprising a processing module and a communication interface, wherein the processing module is configured to execute the relay session establishing method according to claim 6.

12. A remote device, comprising:

a processor, a memory, and an interface for communicating with a relay device;

the memory stores computer-executable instructions;

the processor executes the computer-executable instructions stored in the memory, so that the processor is caused to:

determine a relay service code, RSC, of a traffic, according to description information of the traffic to be transmitted, and an RSC corresponding to each traffic description, the traffic description having at least one characteristic of IP address, domain information, and application identification;

wherein the description information of the traffic comprises at least one characteristic of application identification, domain information, IP address, and traffic attribute of the traffic;

wherein the relay service code is used for indicating a traffic attribute of the traffic in the session establishment process;

discover a relay device according to the relay service code;

establish a relay session with the relay device, wherein the relay session is used for transmitting data of the traffic.

13. The remote device according to claim 12, wherein the processor is caused to:

control the interface to receive discovery messages broadcasted by multiple devices, wherein the discovery message of each device carriers a relay service code supported by the device or authorized to be supported by the device;

determine a device with a discovery message carrying the relay service code corresponding to the traffic as the relay device.

14. The remote device according to claim 12, wherein the processor is caused to control the interface to:

send a discovery request message, wherein the discovery request message comprises the relay service code;

receive a discovery response message, and determining a device sending the discovery response message as the relay device.

* * * * *